INVENTOR
Walter A. Hubbard

BY *White and Haefliger*
ATTORNEYS

United States Patent Office 3,140,986
Patented July 14, 1964

3,140,986
METHOD AND APPARATUS FOR PRODUCING ELECTRICAL POWER AND DISTILLING WATER BY USE OF GEOTHERMAL ENERGY
Walter A. Hubbard, 6008 Buell St., Bell Gardens, Calif.
Filed Jan. 17, 1958, Ser. No. 709,700
7 Claims. (Cl. 202—52)

This invention relates to apparatus and means for converting the kinetic energy of a mass of liquid, such as sea-water or non-potable water, falling down a passage into subterranean basins, or chambers, into hydro-electric energy, with the subsequent removal of such water from those depths by low-pressure or vacuum distillation, through the geothermal heating thereof, so that the saturated water-vapors may rise rapidly to higher elevations for condensation, with heat-exchange to pre-heat cold, raw intake-water.

In accordance with this invention, the kinetic energy of this downwardly accelerating mass of water is first converted into hydro-electric energy during its descent to the deep, underground basins, or chambers, wherein vaporization takes place on a hube scale due to the absorption of geologic heat prevalent in the depths of the earth. Turbo-generators driven by the falling water are placed at vertical intervals in stations along the descent, as there is considerable depth to which the water falls before coming to rest in the lowest basin, with its sumps and float-level control of intake valve to turbines. The discharge from the lowest turbine or set of turbines falls into a large idstributing chamber wherein the flow can be spread out over a larger area before flowing through numerous cored holes in the chamber floor. From the latter the flow passes into the highest evaporating basin or chamber below the distributing chamber. In said basin the flow floods over the floor and drops through cored holes into a lower basin or successively lower basins until the unevaporated water comes to rest finally on the lowermost basin floor. At that level a lake is created with a large open space thereabove, and means may typically be provided to control the lake level for steady state operation of the entire system.

Starting with this lowest evaporating-basin, to pass successively through all basins in funneling upwardly to the surface and the heat-exchange-condenser units, are large, cored shafts or exhaust-ducts. The whole system is airtight and the saturated water-vapors rise rapidly in these ducts by convection and expansion, and if necessary, aided by vapor-booster pumps or fans, enter the heat-exchange-condenser units, condense, and flow out of the units (barometric condensers preferred) when the condensate level inside the unit exceeds the height of a balancing water-column, the barometric equivalent.

The whole system is maintained under near vacuum conditions, the vacuum being originally established by vacuum pumps, and then maintained by the condensation of the saturated water-vapors, the condensation causing the equilibrium of the system to shift towards continual vapor formation to replace the vapors removed. Due to the considerable differences of temperature between that of formation and that of condensation, convection and expansion is rapid and the rate of vaporization is high. Further details will be taken up later.

Additional power may be derived by elevating the barometric condensers and heat-exchanger considerably above height of the barometric equivalent (over 34 ft.) so that the discharging condensate may also be made to drive turbo-generators, before being discharged into the condensate reservoir.

By using cold, raw-water as the circulating, cooling water for the coils or tubes in the condenser-heat-exchange units, heat exchange is made, and the warmed raw-water is then discharged into its special reservoir as pre-heated water of intake. Heat is again gained by friction and work done at the turbines, and lastly through the heat-transfers from the earth and subterranean environment in the deep basin systems, by conduction, convection, contact and radiation.

According to W. Lindgren (Mineral Deposits) the average geothermal gradient is about 1 degree centigrade per every 100 feet of depth. Starting with 11 deg. at 100 ft. of depth, this would mean 60 deg. C. at 5,000 ft. or a rock-temperature of 140 deg. Fah. There are mines that have been carried to a vertical depth of over 5,000 ft. Vertical shafts of a circular nature have been successfully cored up to 7 ft. in diameter with greater economy than with the conventional blasting system.

Gunniting (pressure-sprayed concrete) can be employed to seal and preserve an air-tight system. Natural rockpillars (in place) left as skeleton supports can be used to carry the floor-pillars above, similiarly sealed if necessary to insure and preserve the near vacuum conditions for low-pressure vaporization or distillation effects. The greater the depths of the subterranean system, the greater the rate of distillation.

The latent heat of vaporization is the greatest heat requirement, and its exchange in condensation to pre-heat intake water is a factor of immense importance. The conservation of heat and insulation to prevent losses under the thermo-dynamic laws means that once the system becomes heated and exchange is fully employed, great amounts of heat are not required as continual additions in a closed, insulated system, such as is presented herein, and great masses of water can be continuously vaporized and elevated to surface by geothermal energy alone, leaving the largest part of electrical energy generated through the turbines for industrial and civic uses.

Water-vapor pressure tables show that vapor pressure of water at 60 deg. C. is near 15 centimeters of mercury (atmosphere at sea-level 76 cm. of mercury), and at 70 deg. C., only 10 deg. higher, or 1000 ft. deeper, which is easily obtainable, the vapor-pressure jumps to nearly 24 cm. of mercury. The vaporization may therefore be very rapid even at 60 deg. under a low-pressure, or near vacuum condition, and very much greater at only 70 deg.

With the deep, subterranean basins or vaporizing chambers, providing a square mile or more of surface, the amount of vapor produced is enormous, yet insignificant in its heat requirements in comparison to the heat source of the great rock mass feeding heat continuously into the system to bring everything therein up to its temperature.

These and other objects and advantages of my invention, as well as other details of an illustrative embodiment will be fully understood from the following detailed description of the drawings in which.

Figure 2:
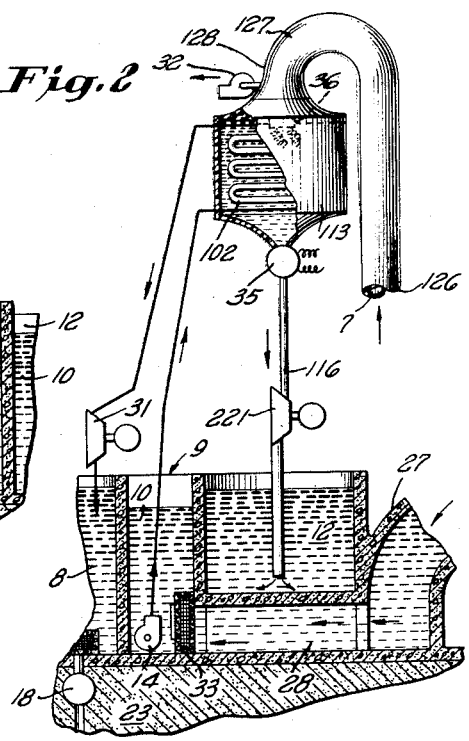
FIG. 2 is a fragmentary vertical section showing further details and also illustrating a modified form of the invention.
Figure 3:
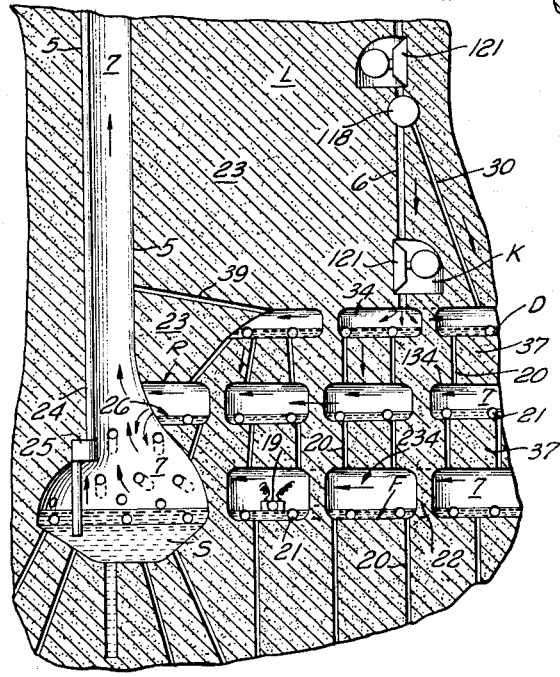
FIG. 3 is a fragmentary plan-view showing the top of the apparatus that is above ground.
Figure 3:
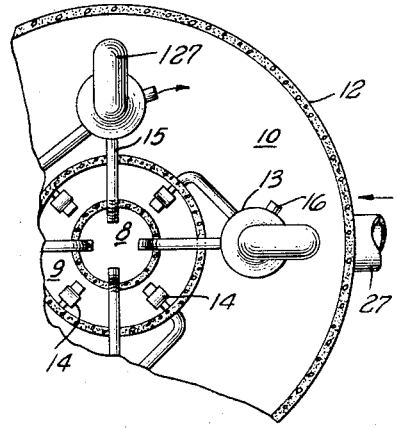

In the drawings 23 indicates a deep rock-formation in the earth, and the structure normally standing above the ground is generally indicated at 4. The latter includes several annular partitions typically forming cold raw water reservoir 9, raw pre-heated intake water reservoir 11 with its pre-heated raw water 8, and a condensate, or fresh-water reservoir 12. Water is supplied from the sea, or other body of water, to reservoir 9 through intake siphon 27, intake pipe 28 and a filter 33, all of which are shown in FIG. 2.

Figure 1:
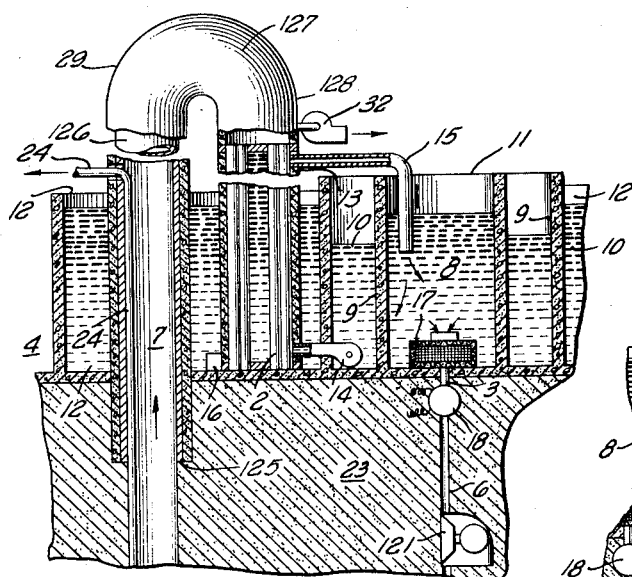
FIG. 1 is a vertical section showing complete apparatus of the invention.

Pumps 14 set in cold raw water reservoir 9 connect to barometric condenser-heat-exchange units 13 (FIG. 1) and circulate the cold raw-water 10 through the tall, upright tubes 2 inside unit 13 for heat exchange, with discharge of 10 into reservoir 11 as preheated, raw-water 8. Similarly, in the modified system shown in FIG. 2, pumps 14 boost the cold raw-water 10 to the elevated barometric condenser-heat-exchange units 113 through internal coils of said units as 102, with return of the heated raw-water passing through turbo-generators 31 before discharging into reservoir 11 as in first instance (FIG. 1). Float-valve 36 inside unit 113 electrically controls valve 35 in the discharge line 116 which supplies turbine-generator unit 221 before this condensate enters the reservoir 12 below.

The preheated water 8 passes through filter 17 built into the bottom of reservoir 11 and into intake 3, down passage 6 in rock-formation 23. A valve 18 at the head of the passage controls the amount of flow to turbo-generators below, the said valve being electrically operated by the control of float 19 set in the lowest basin 234. The passage 6 preferably extending downwardly several thousand feet into rock formation of the earth. Although only one passage 6 is shown for purposes of illustration, more can be installed to suit the engineering requirements, and connect to reservoir 11. The turbo-generators 121 set in stations L of considerable vertical interval along passage 6 are successively driven by the downwardly accelerating water in 6. A by-pass valve 118 which can be electrically operated from the surface at will can cut out the last or lower turbo-generators when power is not required, passage 30 being then employed to convey and discharge the flow into distributing chamber 34, which, in turn breaks up the heavy flow, spreads it throughout the chamber 34 and thence the warm, raw-water finds its way rapidly through the numerous cored holes 20 in the floor D into the next lower basin 134, preferably of much larger floor-area, with its roof or "back" R sloping upwardly as it approaches the huge exhaust ducts 5 in 23 near the perimeter of the basin or chamber 134, the said exhaust ducts 5 serving to remove the saturated water-vapors 7 from the subterranean depth of the basins to the surface, and the condenser-system.

Other large cored-holes 21 fan out laterally into the walls of the chambers (34, 134, 234, etc.) near their respective floors so that more remote heat is furnished the said vaporizing basins by both contact and conduction. The numerous cored-holes in floors permit spreading and semi-flooding and create spray effect as the water falls in divided streams through floor, through space to floor below, successively.

The evaporating basins (typical as 134) are huge, open chambers of great floor area, with supporting columns 22 of rock in place, or of reinforced concrete, to carry the floor-pillars 37 above, allowing free and rapid movement of the saturated water-vapors created therein to move towards the exhaust ducts 5. The preferred arrangement is central passage 6 with discharge from the lowest station K flowing into the distributing chamber 34 and finally being brought to rest in the lowest evaporating basin 234, with the exhaust ducts, if more than one, being positioned symmetrically and outwardly from the central turbine system, and considerably below it, the station-system (typical as L) being sealed off from the saturated-vapor system so that atmospheric conditions can be allowed in the stations.

Construction details are omitted, but man-ways can be provided to the station system either as a compartment of 6 or a separate shaft. Passage 39 can also be used for man-way and material transfers when not operating; during operations 39 is a vent to remove any saturated vapors 7 from 34, as 34 need not be as large as the evaporating basins.

A lip or weir 26 is employed to preserve a shallow flooding in the upper basins like 134, the excess flow spilling over into the exhaust ducts 5 to form spray in the fall through the up-draft, with any liquid not being vaporized in its descent, collecting in the lowest basin 234. The whole evaporating system finds its control by the regulation of the height of the liquid accumulating on the floor F of 234 through float 19 and its operation of electrical means to actuate valve 18 of the intake.

A sump S, provided with a force pump 25 and pipeline 24, removes the accumulating, concentrated brine from sump to the surface (preferably) for processing of its minerals. The gently sloping floor F allows the heavier, saline material to seek its own level in the quieter, deeper parts of the sump for pumping.

In addition to exchange in the basin proper, large, lateral bores 21 are fanned out near the floor of all chambers like 34, 134, 234, to bring more remote heat from the rock-mass 23 into the system more quickly, liquid being a better conductor of heat than rock. Similarly, large bore-holes 220 of a downward nature bring heat from greater depths into the vapor system.

Saturated vapors 7 flowing upwardly into 126 are reversed in bend at 127, slowed, and begin to cool in the down-branch 128 which connects to heat-exchange-condenser unit 13 (FIG. 1). Tall cooling tubes 2 filled with circulating, cold, raw-water 10 condense the vapors and the cold condensate after exceeding a level inside unit 13 of the barometric equivalent of a balancing water-column, flows freely out of the unit at 16, while the cooling water flows separately by way of pipe-line 15 into intake reservoir 11. Pump 14 set in reservoir 9 circulates water.

In FIG. 2, the modified arrangement, the condenser-heat-exchanger unit is elevated and shown as 113, with the coils 102 submerged in the condensate, the level of the condensate being controlled by discharge valve 35 which is regulated by an electrical means from float 36 inside 113. Discharge pipe 116 goes through turbo-generators 221 before flowing into condensate reservoir 12. Also pump 14 circulates the cold raw-water as before through 102 and the returning water is made to drive another turbo-generator 31 to recover energy expended in pumping the elevations.

It is to be realized that no loss, but a gain is achieved as depth is obtained for the system. This applies to the increments in potential energy for conversion into hydro-electric energy, as well as for the increments in geologic or geo-thermal intensity, as the temperature increments boost the vapor-pressure and hence rate of distillation under the near vacuum conditions presented.

In the operation of the system, evacuation is made of the subterranean system by starting up vacuum pumps 32 while operating with proper sealing in the reservoirs, and the condenser units filled with fresh-water to preserve vacuum conditions. Once the air or gases are exhausted from the system, the intake valve can be opened automatically by float 19, and pumps 32 can be shut down. If at any time non-condensable gases should accumulate, these said vacuum pumps can remove them and again be shut down, the barometric type of condenser will quickly reveal such partial pressures.

Sea-water is 3.5% salt, 35,000 parts per million (p.p.m.) whereas many large bodies of non-potable water are only from 2,000 to 5,000 p.p.m. The heaviest pump-back duty therefore lies with sea-water, and if this is carried at a 10 to 15% solution in the basin (234) with a sump reaching a somewhat higher concentration, the pump-back duty can be only about ¼ of the total intake, leaving tremendous amounts of electrical energy available for other purposes. But with the non-potable waters the pump-back is very low, and the free energy can be nearly thirty times the above, or more.

This geothermal heating and vaporizing system presented herein as my invention has many advantages over other systems for evaporating sea-water to obtain a pure water supply as condensate, as for example so-called solar systems. Thus, the advantage taken of the geothermal temperature gradient provides for heat-exchange on a much greater scale and at less expense than is possible with any known solar systems. Further, the subterranean temperatures may be selected with increments in temperatures varying directly with the depth, and with such temperatures remaining constant and not variable as they are encountered with solar heating due to day and night, season and locality.

Moreover, electrical energy can be produced simultaneously in very large amounts, rivaling the hydro-electric energy as produced in the conventional, above surface practices today from dams etc. Also, this invention provides for the economic utilization of any large body of still water of a non-potable nature that such water may be converted into fresh water supply and at same time provide the potential energy for a subterranean hydro-electric system as outlined in the above. Even bad well-water need not be pumped to surface, but may be fed into the presented system for the purposes outlined and otherwise. In all cases the increments in depth provide both greater potential and thermal energy for a given mass of liquid.

In addition, the present underground, geothermal system does not have the vulnerability to destruction that is associated with long aqueduct systems and distant power-lines from huge dam installations which are plainly exposed for bombing with attendant disaster if disrupted. The subterranean system as presented herein is invisible and does not interfere with surface uses in its under-ground extensiveness.

I claim:

1. A system operable to extract energy from falling water and to obtain fresh-water condensate therefrom, comprising reservoir means containing water, a downward passage extending into the earth receiving water dropping from said reservoir means, horizontally extended upper chamber means in hot subterranean rock and communicating with said down passage for collecting and horizontally spreading said water, horizontally extended upper and lower basins in the hot subterranean rock below the level of said upper chamber means, generally vertical bore holes in the hot rock for passing openly falling streams of water in succession from said upper chamber means to said upper basin and then to said lower basin, an up-passage in the earth communicating with said basins for flowing water vapor upwardly therefrom, means for controlling the surface level of water in the lower basin, means for removing brine from the water in said lower basin, means communicating with the upper portion of said up-passage and operable to keep the pressure therein reduced below atmospheric thereby promoting upward flow of said vapor in said up-passage, and means through which said water vapor discharging from said up-passage and said reservoir water circulate independently and in heat exchange relation, condensing said vapor and pre-heating said reservoir water.

2. A system operable to extract energy from falling sea water and to obtain fresh-water condensate therefrom, comprising reservoir means including first and second reservoirs containing sea water and a third reservoir containing fresh-water condensate, down-passage means extending into the earth receiving sea water dropping from said second reservoir means, horizontally extended upper chamber means in hot subterranean rock and communicating with said down-passage for collecting and horizontally spreading said water, horizontally extended upper and lower basins in the hot subterranean rock below the level of said upper chamber means, generally vertical bore holes in the hot rock for passing openly falling streams of water in succession from said upper chamber means to said upper basin and then to said lower basin, an up-passage in the earth communicating with said basins for flowing water vapor upwardly therefrom, means including a power regulating float for controlling the surface level of water in the lower basin, means for removing brine from the water in said lower basin, means communicating with the upper portion of said up-passage and operable to keep the pressure therein reduced below atmospheric thereby promoting upward flow of said vapor in said up-passage, and means through which said water vapor discharging from said up-passage and sea water from said first reservoir circulate independently and in heat exchange relation, condensing said vapor for collection in said condensate reservoir and preheating sea water from said first reservoir for collection in said second reservoir means.

3. The invention as defined in claim 2 in which said last named means includes a conduit communicating with the upper end of said up-passage, said conduit having in series an upwardly extending branch, a return bend and a downwardly extending branch for diverting the flow of said water vapor in a downward direction, and tubing in said down branch of the conduit circulating sea water therein for condensing said vapor.

4. The invention as defined in claim 2 in which said last named means includes a condensate accumulator elevated above the surface level of water in said condensate reservoir.

5. The invention as defined in claim 4 in which said last named means includes a conduit communicating with the upper end of said passage, said conduit having in series an upwardly extending branch, a return bend above the level of said accumulator and a downwardly extending branch for directing the flow of vapor in a downward direction, and tubing in the path of vapor flowing from said down branch and containing sea water circulating from the first reservoir to the second reservoir.

6. The method of extracting energy from falling saline water and of obtaining fresh-water condensate therefrom, that includes dropping a supply stream of saline water through a down passage extending into the earth, collecting said dropping water in upper and lower enlarged basins formed in subterranean rock at elevated temperature so that heat flows from rock to said collected water, openly dropping said water from said upper to said lower basins in divided and transversely distributed streams through rock passages interconnecting said basins, converting said collected water into water vapor, maintaining the lowest basin only partly filled with water so that the water therein has an extensive free surface above which the water vapor collects at reduced pressure, removing concentrated brine from said lowest basin, conducting only water vapor at pressure reduced below atmospheric upwardly from said basins through an up-passage in the earth, holding the pressure in the upper portions of the up-passage reduced below atmospheric thereby to promote upward flow of said vapor in said up-passage, condensing said vapor and pre-heating said supply water by circulating said water and vapor in heat exchange relation, withdrawing the vapor condensate and supplying saline water from a natural body thereof to said down-passage.

7. The method of claim 6 including utilizing said dropping water to drive a turbo-generator for generating electrical current.

References Cited in the file of this patent

UNITED STATES PATENTS

| | | |
|---|---|---|
| 995,219 | Bradley | June 13, 1911 |
| 1,966,938 | Stone | July 17, 1934 |
| 2,006,985 | Claude et al. | July 2, 1935 |
| 2,332,294 | Bohmfalk | Oct. 19, 1943 |
| 2,490,659 | Snyder | Dec. 6, 1949 |
| 2,636,129 | Agnew | Apr. 21, 1953 |
| 2,716,446 | Ross | Aug. 30, 1955 |

FOREIGN PATENTS

| | | |
|---|---|---|
| 11,511 | Australia | May 18, 1908 |
| 361,473 | Germany | Oct. 14, 1922 |

OTHER REFERENCES

Scientific American, Oct. 27, 1917, vol. 117, No. 17, page 305, Scientific American Inc.

Science and Mechanics, October 1951, pages 95–97.

Ellis: "Fresh Water From the Ocean," Ronald Press Co., N.Y., 1954.